(12) United States Patent
Lee et al.

(10) Patent No.: US 7,912,566 B2
(45) Date of Patent: Mar. 22, 2011

(54) SYSTEM AND METHOD FOR TRANSMITTING/RECEIVING OBJECT-BASED AUDIO

(75) Inventors: Tae-Jin Lee, Daejon (KR); Jae-Hyoun Yoo, Daejon (KR); In-Seon Jang, Daejon (KR); Yong-Ju Lee, Daejon (KR); Jeong-Il Seo, Daejon (KR); Dae-Young Jang, Daejon (KR); Kyeong-Ok Kang, Daejon (KR); Jin-Woo Hong, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1176 days.

(21) Appl. No.: 11/591,157

(22) Filed: Nov. 1, 2006

(65) Prior Publication Data

US 2007/0101249 A1    May 3, 2007

(30) Foreign Application Priority Data

Nov. 1, 2005  (KR) .................. 10-2005-0103733
Dec. 15, 2005  (KR) .................. 10-2005-0123816

(51) Int. Cl.
  *G06F 17/00* (2006.01)
(52) U.S. Cl. .................................................. 700/94
(58) Field of Classification Search ............... 700/94
  See application file for complete search history.

(56) References Cited

U.S. PATENT DOCUMENTS

| | | | |
|---|---|---|---|
| 5,390,138 A | 2/1995 | Milne et al. | |
| 5,544,297 A | 8/1996 | Milne et al. | |
| 7,199,836 B1 * | 4/2007 | Eleftheriadis et al. | ........ 348/578 |

FOREIGN PATENT DOCUMENTS

| | | |
|---|---|---|
| KR | 1020000042559 | 7/2000 |
| KR | 1020030022773 | 3/2003 |
| KR | 1020030065002 | 8/2003 |
| KR | 1020020065918 | 5/2004 |
| KR | 1020040037437 | 5/2004 |
| KR | 1020050019630 | 3/2005 |
| WO | WO98/36559 | 8/1998 |
| WO | WO01/31497 | 5/2001 |
| WO | WO2004/051624 | 6/2004 |

OTHER PUBLICATIONS

"Object-based 3D Audio Broadcasting System through Terrestrial-DMB." Taejin Lee et al., 2005 General Meeting for Acoustical Society of Korea, Proceedings of Fall Conference Papers., Nov. 10-11, 2005., vol. 24, issue 2(s).
Korean Notice of Patent Grant dated Jun. 7, 2007 for the corresponding application KR10-2005-0123816.

* cited by examiner

*Primary Examiner* — Andrew C Flanders
(74) *Attorney, Agent, or Firm* — Ladas & Parry LLP

(57) ABSTRACT

Provided is a system and method for transmitting/receiving an object-based audio. The system includes: a pre-processing unit for receiving an audio signal from diverse sources of outside and creating an object-based audio signal through a pre-processing procedure; an object-based audio editing unit for editing the object-based audio signal from the pre-processing unit and organizing an audio scene; an object-based audio coding unit for coding/multiplexing information on the object-based audio signal and the audio scene from the object-based audio editing unit and creating object-based audio contents; and a transmitting unit for transmitting the object-based audio contents from the object-based audio coding unit.

14 Claims, 8 Drawing Sheets

SYSTEM AND METHOD FOR TRANSMITTING/RECEIVING OBJECT-BASED AUDIO

FIELD OF THE INVENTION

The present invention relates to a system and method for transmitting/receiving an object-based audio; and, more particularly, to an object-based audio transmitting/receiving system and method for an interactive audio service which can form an audio scene by controlling an audio signal based on an object.

DESCRIPTION OF RELATED ART

An audio scene of the present invention includes space information and location of a sound source. The space information shows acoustic characteristics including the sound source and means characteristics such as a size and a form of the space, and reflection, absorption, and penetration of an inside sound. The spatial location information means characteristics such as a distance from the sound source, an angle of a horizontal/vertical feature centering around a virtual location of a user.

Meanwhile, in a typical stereo or an audio technology based on a multi-channel, the user can only listen to an audio signal according to intention of an editor. That is, the typical stereo or the audio technology based on the multi-channel downmixes the audio signal, which is acquired by using diverse microphones through the stereo or the multi-channel, and transmits the audio signal to the user. The user inactively listens to only the audio signal intended by the editor.

Three dimensional (3D) audio technology adding directionality or distance/space sense to the typical stereo or the multi-channel sound source provides realistic audio signal to an audience. However, the user is still an inactive audience.

SUMMARY OF THE INVENTION

It is, therefore, an object of the present invention to provide an object-based audio transmitting system and method for transmitting diverse object-based audio scenes to a user according to intention of a user.

It is another object of the present invention is to provide an object-based audio receiving system and method that the user can select an audio scene among diverse object-based audio scenes according to a user's preference and forms a certain audio scene by changing the audio scene according to the user's preference.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided an object-based audio transmitting system, the system including: a pre-processing unit for receiving an audio signal from diverse sources of outside and creating an object-based audio signal through a pre-processing procedure; an object-based audio editing unit for editing the object-based audio signal from the pre-processing unit and organizing an audio scene; an object-based audio coding unit for coding/multiplexing information on the object-based audio signal and the audio scene from the object-based audio editing unit and creating object-based audio contents; and a transmitting unit for transmitting the object-based audio contents from the object-based audio coding unit.

In accordance with another aspect of the present invention, there is provided an object-based audio receiving system, the system including: a receiving unit for receiving object-based audio contents transmitted from an object-based audio transmitting system; an object-based audio decoding unit for decoding the object-based audio contents including additional data on an object-based audio signal and an audio scene from the receiving unit; a user control unit for outputting a user controlled scene signal for organizing the audio scene according to control of a user and a user controlled restoration signal for setting up a restoration environment; an object-based audio scene synthesizing unit for organizing the audio scene based on the object-based audio contents from the object-based audio decoding unit according to the user controlled scene signal from the user control unit; and a restoring unit for restoring the object-based audio contents from the object-based audio scene synthesizing unit according to the user controlled restoration signal from the user control unit.

In accordance with another aspect of the present invention, there is provided an object-based audio transmitting method, the method including the steps of: a) receiving an audio signal from diverse sources and creating an object-based audio signal through a pre-processing procedure; b) editing the created object-based audio signal and organizing an audio scene; c) coding/multiplexing information on the edited object-based audio signal and the organized audio scene and creating object-based audio contents; and d) transmitting the created object-based audio contents.

In accordance with another aspect of the present invention, there is provided an object-based audio receiving method, the method including the steps of: a) receiving object-based audio contents transmitted from an object-based audio transmitting system; b) decoding the transmitted object-based audio contents including additional data related to an object-based audio signal and an audio scene; c) organizing the audio scene based on the decoded object-based audio contents according to the user controlled scene signal; and d) restoring the object-based audio contents organizing the new scene according to a user controlled restoration signal.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become even more apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
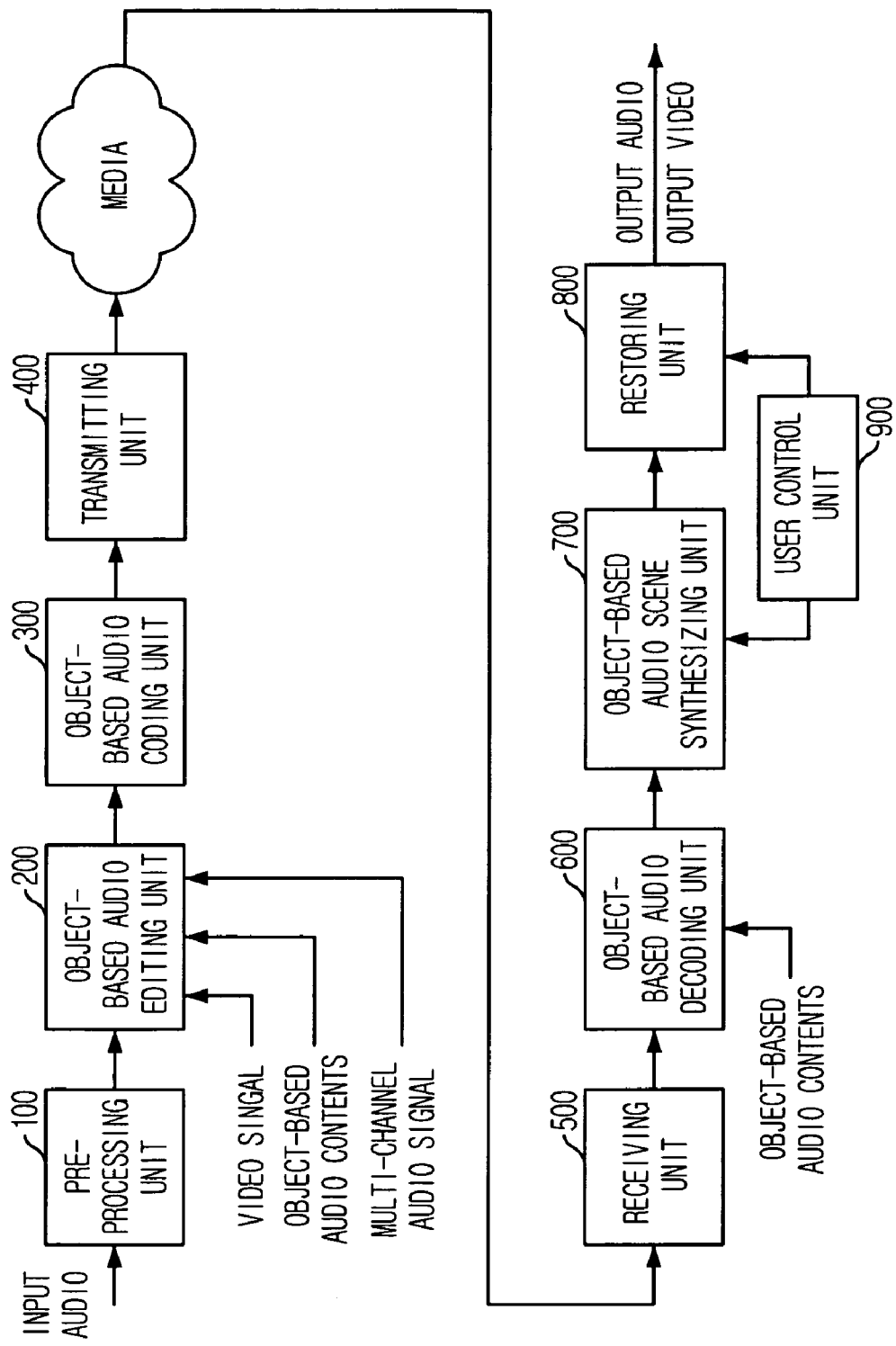
FIG. 1 is a block diagram illustrating an entire object-based audio transmitting/receiving system in accordance with an embodiment of the present invention.

FIG. 1 is a block diagram showing an entire object-based audio transmitting/receiving system in accordance with an embodiment of the present invention. The object-based audio transmitting system of the present invention includes a pre-processing unit 100, an object-based audio editing unit 200, an object-based audio coding unit 300, and a transmitting unit 400. The object-based audio transmitting system receives an audio signal, edits the audio signal based on an object, multiplexes the audio signal based on a video signal and additional data, and transmits the audio signal to an object-based audio receiving system through media, e.g., a wired/wireless communication system.

More specifically, the pre-processing unit 100 receives the audio signal from diverse external sources and creates an object-based audio signal through a pre-processing procedure. The object-based audio editing unit 200 edits the object-based audio signal from the pre-processing unit and forms an audio scene. The object-based audio coding unit 300 codes/multiplexes information on the object-based audio signal and the audio scene from the object-based audio editing unit 200, and creates the object-based audio contents. The transmitting unit 400 transmits the object-based audio contents from the object-based audio coding unit 300 through diverse media. More detailed embodiment will be described hereinafter with reference to FIGS. 2 and 4.

Meanwhile, the object-based audio receiving system of the present invention includes a receiving unit 500, an object-based audio decoding unit 600, an object-based audio scene synthesizing unit 700, a restoring unit 800 and a user control unit 900. The object-based audio receiving system receives object-based audio contents from object-based audio transmitting system through media, e.g., a wired/wireless communication system and forms/outputs an audio scene according to user's control.

More specifically, the receiving unit 500 receives the object-based audio contents transmitted from the object-based audio transmitting system through the media. The object-based audio decoding unit 600 decodes additional data related to object-based audio contents, e.g., the object-based audio signal and the audio scene, from the receiving unit 500. The user control unit 900 outputs the user controlled scene signal for forming an audio scene according to user control and the user controlled restoration signal for setting up a restoration environment. The object-based audio scene synthesizing unit 700 organizes the audio scene based on the object-based audio contents, e.g., additional data related to the object-based audio signal and the audio scene, from the object-based audio decoding unit 600 according to the user controlled scene signal from the user control unit 900. The restoring unit 800 restores the object-based audio contents, e.g., additional data related to the object-based audio signal and the audio scene, from the object-based audio scene synthesizing unit 700 according to the user controlled restoration signal from the user control unit 900. More detailed embodiment will be described hereinafter with reference to FIGS. 5 and 8.

Meanwhile, the video signal, the object-based audio contents, and multi-channel audio signal inputted from outside to the object-based audio editing unit 200 are additional constituent elements of the present invention, and will be described in detail with reference to FIG. 3. Also, the object-based audio contents inputted from outside to the object-based audio decoding unit 600 are additional constituent elements of the present invention and will be described in detail with reference to FIG. 5.

Figure 2:
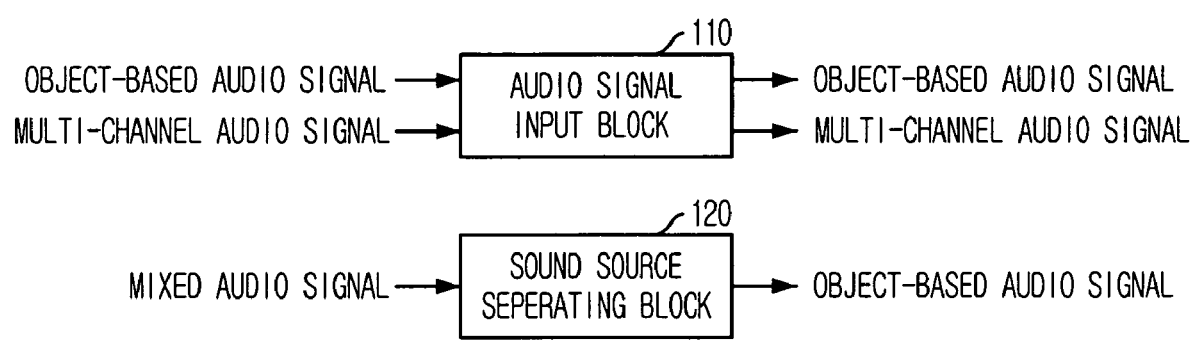
FIG. 2 is a block diagram illustrating a pre-processing unit of FIG. 1.

FIG. 2 is a block diagram illustrating the pre-processing unit of FIG. 1. The pre-processing unit 100 includes an audio signal input block 110 for receiving the object-based audio signal and the multi-channel audio signal from outside, and a sound source separating block 120 for receiving a mixed audio signal from outside and creating an object-based audio signal through a sound source separating process.

The audio signal input block 110 receives the object-based audio signal and the multi-channel audio signal from diverse external sound sources and transmits the object-based audio signal and the multi-channel audio signal to the object-based audio editing unit 200.

When the sound source, i.e., the mixed audio signal, in which the diverse audio signals are mixed, is inputted, the sound source separating block 120 separates the mixed audio signal based on the object, then creates the object-based audio signal and eventually outputs the object-based audio signal to the object-based audio editing unit 200. For example, when the audio signal acquired through a directional microphone is inputted, the sound source separating block 120 creates the object-based audio signal whose sound source separation of each audio signal is improved.

Figure 3:
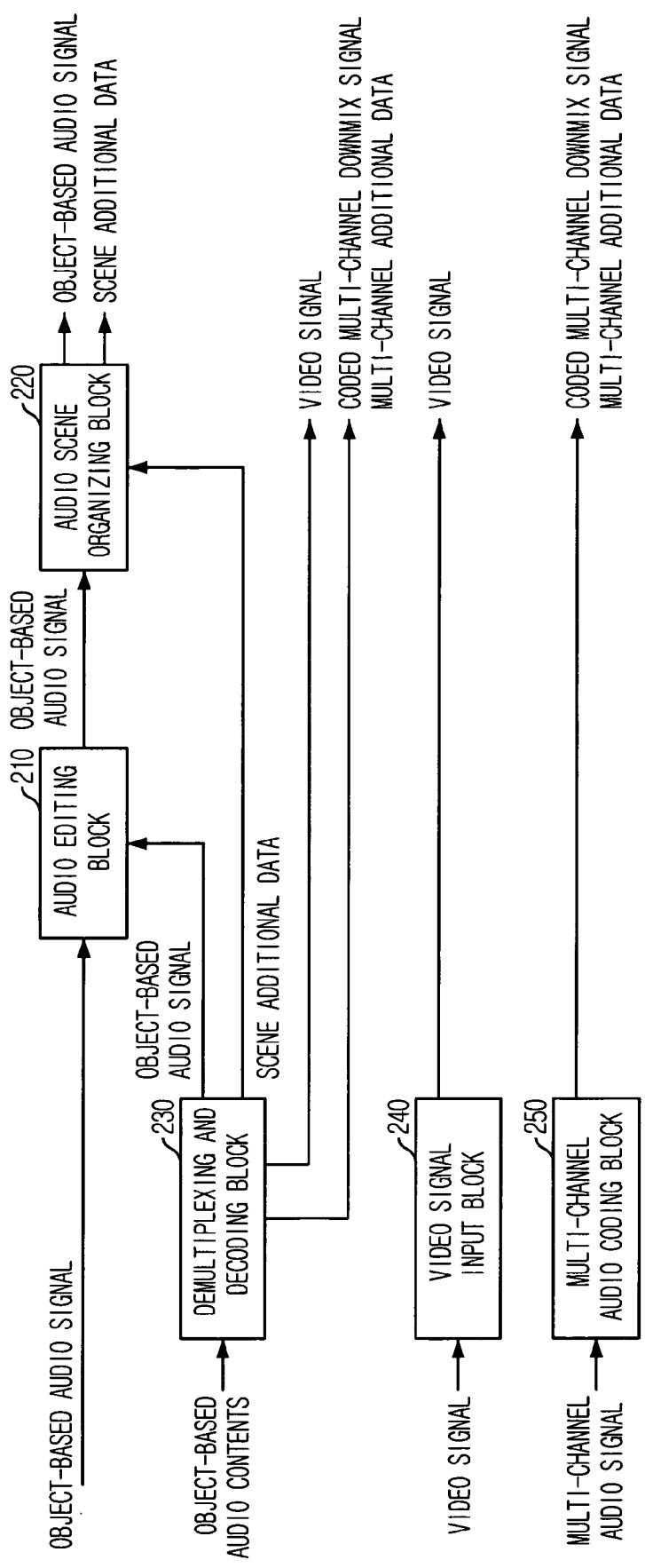
FIG. 3 is a block diagram illustrating an object-based audio editing unit of FIG. 1.

FIG. 3 is a block diagram illustrating the object-based audio editing unit of FIG. 1. The object-based audio editing unit 200 includes an audio editing block 210, an audio scene organizing block 220 and a multi-channel audio coding block 250. Also, the object-based audio editing unit 200 can further includes a demultiplexing and decoding block 230 or a video signal input block 240. A formation and operation of the object-based audio editing unit 200 will be described in detail hereinafter.

The audio editing block 210 edits the object-based audio signal from the audio signal input block 110 and the sound source separating block 120 of the pre-processing unit 100 and the object-based audio signal from the demultiplexing and decoding block 230.

The audio scene organizing block 220 organizes an audio scene based on the object-based audio signal from the audio editing block 210 and the scene additional data from the demultiplexing and decoding block 230.

The multi-channel audio coding block 250 receives and codes the multi-channel audio signal from the audio signal input block 110 of the pre-processing unit 100 and a multi-channel audio signal from outside.

The demultiplexing and decoding block 230 demultiplexes and decodes the pre-manufactured object-based audio contents, which are inputted from outside.

The video signal input block 240 receives a video signal from outside.

More specifically, the audio editing block 210 receives the object-based audio signal from the audio signal input block 110 of the pre-processing unit 100 and the object-based audio signal of the sound source separating block 120, or additionally receives the object-based audio signal from the demultiplexing and decoding block 230. Subsequently, the audio editing block 210 creates the object-based audio signal adding, mixing, and sound effect editing according to the audio signal, and outputs the object-based audio signal to the audio scene organizing block 220. The sound effect editing means diverse sound effect editing such as a level of the sound source, reverberation addition and modulation. That is, the audio editing block 210 mixes the object-based audio signal, creates audio objects of the number as many as the system can process, performs diverse sound effect signal processes such as reverberation and modulation on the audio object, and creates the object-based audio signal.

The audio scene organizing block 220 receives the object-based audio signal from the audio editing block 210 or additionally receives scene additional data from the demultiplexing and decoding block 230 such that the editor can arrange the object-based audio signal on the audio scene and organize the audio scene. The audio scene includes information on location of the object-based audio signal, space information of the audio scene and other information. The location information of the object-based audio signal includes information on distance from a virtual user location to the audio of each object and information on a horizontal and vertical angles of the audio signal of each object in a virtual user location. The space information of the audio scene means information on the space having the audio signal of each object, and includes characteristics such as a size, a form and a reverberation time of the space, and reflection, absorption and penetration of inside sound. Other information includes level and form information of the sound source of each object. The audio scene organizing block 220 outputs information on the audio scene organized by the editor based on the object-based audio signal in a scene additional data form to the object-based audio coding unit 300 with the object-based audio signal. Accordingly, the editor can organize diverse audio scenes based on the object-based audio signal in the audio scene organizing block 220. Also, the user can select and listen to the audio scene which fits to user's preference among diverse audio scenes organized by the editor.

That is, the audio scene organizing block 220 adds scene additional data on diverse audio scene organizations of editor in the object-based audio contents such that the editor organizes diverse audio scenes in an object-based audio content and transmits the object-based audio contents, and the user can select and listen to the audio scene which fits to the user's preference among diverse audio scenes intended by the editor in a receiving system.

The demultiplexing and decoding block 230 demultiplexes/decodes the object-based audio contents inputted from outside, creates and outputs an object-based audio/video signal/scene additional data/coded multi-channel downmix signal/multi-channel additional data to each block such that the editor can edit the pre-manufactured object-based audio contents again.

As an additional constituent element, the video signal input block 240 receives a video signal, which is a background of an audio scene from outside, and outputs the video signal to the object-based audio coding unit 300.

The multi-channel audio coding block 250 receives the multi-channel audio signal from the audio signal input block 110 of the pre-processing unit or additionally receives the multi-channel audio signal from outside. Subsequently, the multi-channel audio coding block 250 downmixes the multi-channel audio signal as a mono or a stereo form, and extracts multi-channel additional data for extension into a multi-channel. That is, when the multi-channel audio signal is inputted as a background sound, the multi-channel audio coding block 250 downmixes the multi-channel audio signal as a mono or stereo form, outputs the multi-channel audio signal to the object-based audio coding unit 300, and information on the multi-channel audio to the object-based audio coding unit 300 as a multi-channel additional data form. The multi-channel additional data are information for extending the downmixed mono or stereo signal to the multi-channel. The background sound means an audio signal excluding the object-based audio signal that the user can control in the output system.

Figure 4:
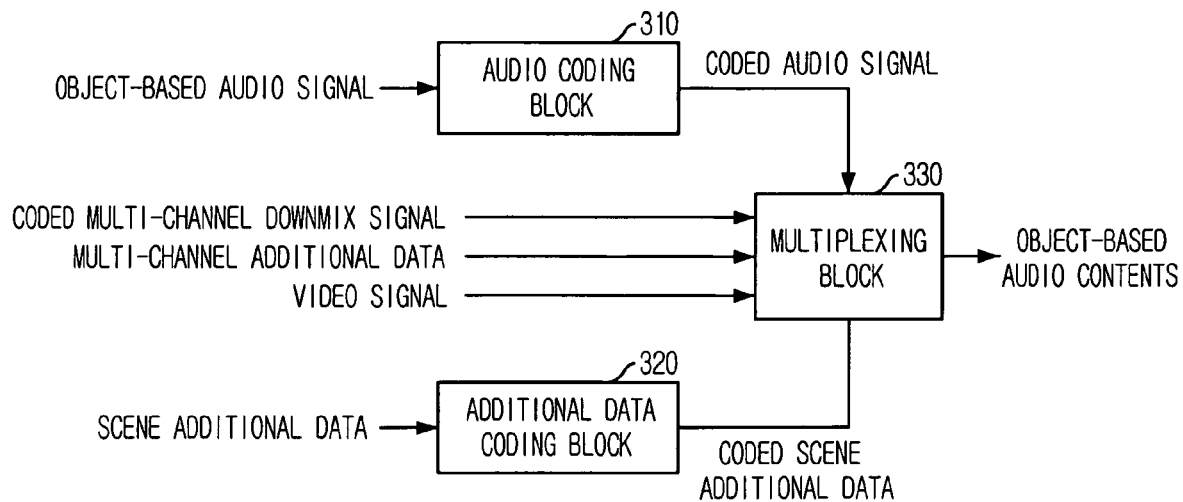
FIG. 4 is a block diagram illustrating an object-based audio coding unit of FIG. 1.

FIG. 4 is a block diagram illustrating the object-based audio coding unit of FIG. 1. The object-based audio coding unit 300 includes an audio coding block 310, an additional data coding block 320, and a multiplexing block 330.

The audio coding block 310 codes the object-based audio signal from the object-based audio editing unit 200.

The additional data coding block 320 codes scene additional data, which are information on the audio scene from the object-based audio editing unit 200.

The multiplexing block 330 multiplexes the audio signal coded in the audio coding block 310, the scene additional data coded in the additional data coding block 320, the multi-channel downmix signal coded in the object-based audio editing unit 200, the multi-channel additional data and the video signal, and creates the object-based audio contents. Also, the multiplexing block 330 can be realized to additionally receive the video signal.

Meanwhile, the transmitting unit 400 performs transformation for transmitting the object-based audio contents from the multiplexing block 330 to the user through diverse media such as a wired/wireless communication system. The transmitting unit 400 demultiplexes the object-based audio contents created in the multiplexing block 330 and transmits each of the object-based audio contents to the object-based audio receiving system. Otherwise, the transmitting unit 400 transmits the object-based audio contents created in the multiplexing block 330 to the object-based audio receiving system and the receiving unit 500 demultiplexes the object-based audio contents.

Meanwhile, the receiving unit 500 extracts the object-based audio signal/scene additional data/multi-channel downmix signal/multi-channel additional data coded in the object-based audio contents transmitted through diverse media, from the object-based audio transmitting system and transmits the extracts to the object-based audio decoding unit 600. Otherwise, the receiving unit 500 can be realized to transmit the object-based audio/video signal/scene additional data/multi-channel downmix signal/multi-channel additional data coded in the object-based audio contents transmitted through diverse media from the object-based audio transmitting system to the object-based audio decoding unit 600 to be operated correspondingly to the above-mentioned example. When the object-based audio contents transmitted from the object-based audio transmitting system are multiplexed, the receiving unit 500 can also be realized to demultiplex the object-based audio contents and to extract each of the data.

Figure 5:
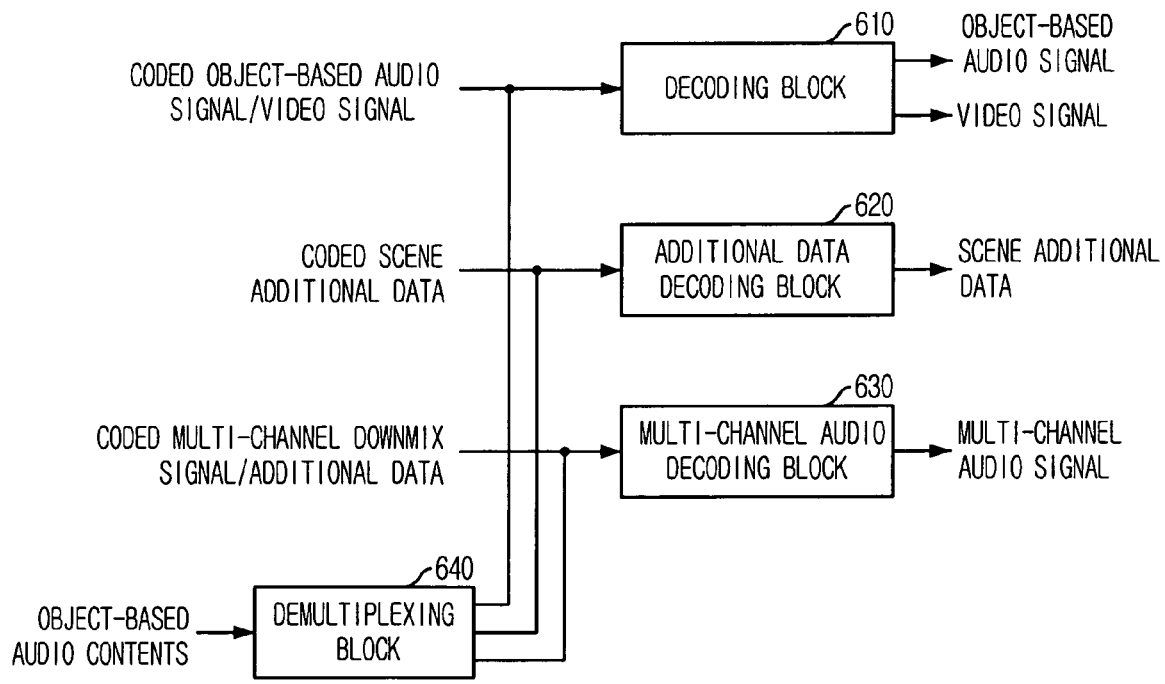
FIG. 5 is a block diagram illustrating an object-based audio decoding unit of FIG. 1.

FIG. 5 is a block diagram illustrating the object-based audio decoding unit of FIG. 1.

The object-based audio decoding unit 600 includes: a decoding block 610, an additional data decoding block 620 and a multi-channel audio decoding block 630. Also, the object-based audio decoding unit 600 can additionally include a demultiplexing block 640. A formation and operation of the object-based audio decoding unit 600 will be described as follows.

The decoding block 610 decodes the coded object-based audio/video signal from the receiving unit 500 and the coded object-based audio/video signal from the demultiplexing block 640.

The additional data decoding block 620 decodes the coded scene additional data from the receiving unit 500 and the coded scene additional data from the demultiplexing block 640.

The multi-channel audio decoding block 630 decodes the multi-channel downmix signal and the multi-channel additional data, which are coded from the receiving unit 500 and the multi-channel downmix signal and the multi-channel additional data, which are coded from the demultiplexing block 640, into the multi-channel audio signal.

The demultiplexing block 640 demultiplexes the pre-manufactured object-based audio contents inputted from outside and creates the coded object-based audio/video signal/scene additional data/multi-channel downmix signal/multi-channel additional data.

That is, the decoding block 610 receives the coded object-based audio/video signal from the receiving unit 500 or additionally receives the object-based audio/video signals from the demultiplexing block 640. Subsequently, the decoding block 610 decodes the coded object-based audio/video signals, creates and outputs the object-based audio signal and video signal to the object-based audio scene synthesizing unit 700.

The additional data decoding block 620 receives the coded scene additional data from the receiving unit 500 or additionally receives the coded scene additional data from the demultiplexing block 640. Subsequently, the additional data decoding block 620 decodes/creates scene additional data which are related to the coded audio scene, and outputs the scene additional data to the object-based audio scene synthesizing unit 700.

The multi-channel audio decoding block 630 receives the coded multi-channel downmix signal and multi-channel additional data from the receiving unit 500, or additionally receives the coded multi-channel downmix signal and multi-channel additional data from the demultiplexing block 640. Subsequently, the multi-channel audio decoding block 630 creates the multi-channel audio signal based on the coded multi-channel downmix signal and the multi-channel additional data and outputs the multi-channel audio signal to the object-based audio scene synthesizing unit 700.

The demultiplexing block 640 receives/demultiplexes the pre-manufactured object-based audio contents from outside, extracts and outputs the coded object-based audio/video signal/scene additional data/multi-channel downmix signal/multi-channel additional data to the corresponding decoding block.

Figure 6:
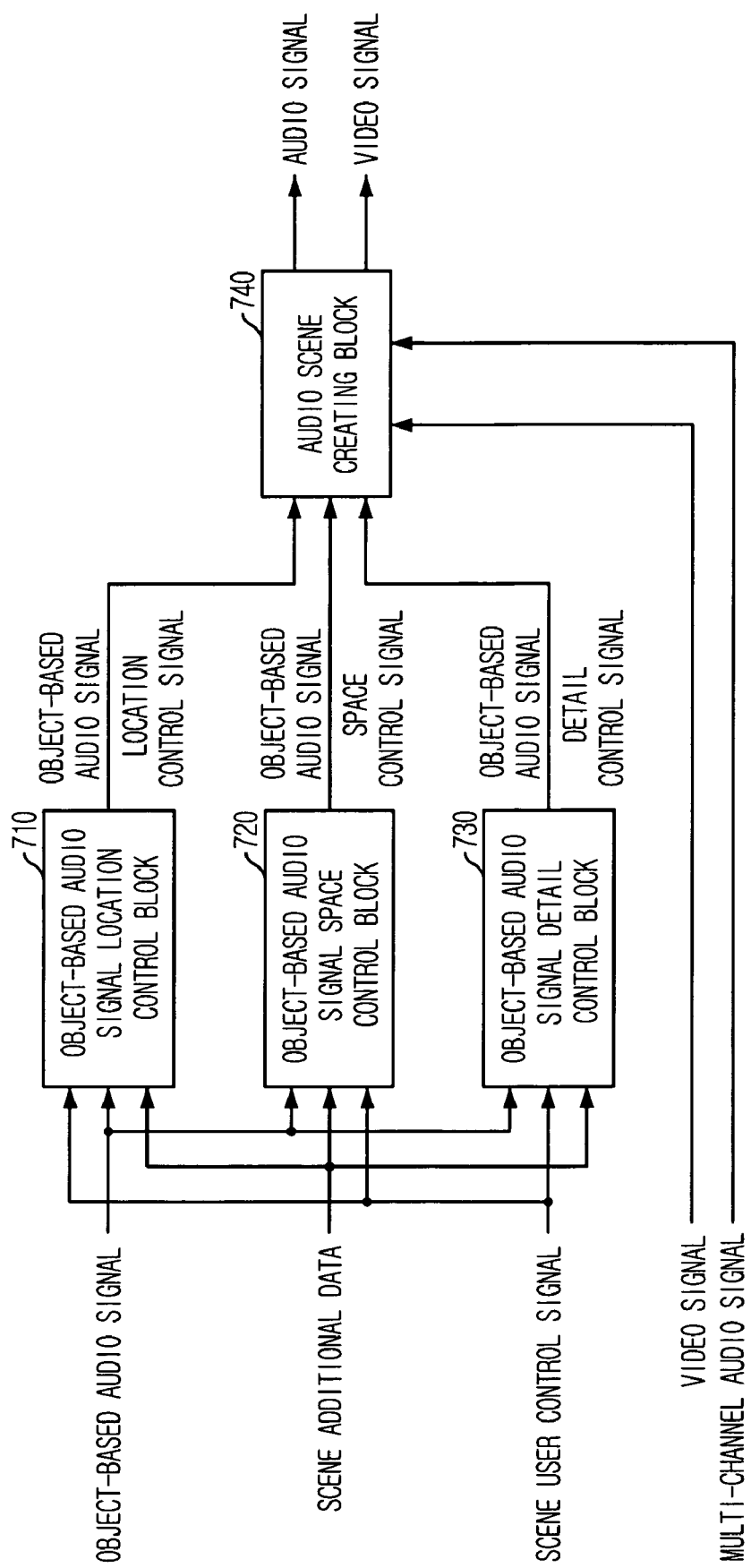
FIG. 6 is a block diagram illustrating an object-based audio scene synthesizing unit of FIG. 1.

FIG. 6 is a block diagram illustrating the object-based audio scene synthesizing unit of FIG. 1. The object-based audio scene synthesizing unit 700 includes an object-based audio signal location control block 710, an object-based audio signal space control block 720, an object-based audio signal detail control block 730 and an audio scene creating block 740.

The object-based audio signal location control block 710 controls a location of the object-based audio signal based on information on location control of the object-based audio signal among the object-based audio signal and the scene additional data from the object-based audio decoding unit 600, and the user controlled scene signal from the user control unit 900. Subsequently, the object-based audio signal location control block 710 outputs the object-based audio signal and the location control signal to the audio scene creating block 740. The location of the object-based audio signal includes information on a distance from the object-based audio signal based on a virtual user location and horizontal/vertical angles.

The object-based audio signal space control block 720 controls characteristics related to a space of the object-based audio signal based on information on the spatial characteristics of the audio scene among the object-based audio signal and the scene additional data from the object-based audio decoding unit 600, and the user controlled scene signal from the user control unit 900. Subsequently, the object-based audio signal space control block 720 outputs the object-based audio signal and a space control signal to the audio scene creating block 740. The information on the spatial characteristics includes a size, a form, a reverberation time of the space. The information also includes characteristics such as reflection, absorption and penetration of an inside sound.

The object-based audio signal detail control block 730 controls other characteristics of the object-based audio signal, i.e., a level or a form of the audio object, based on other control information on the object-based audio signal, i.e., information on the level or the form of the audio object, among the object-based audio signal and the scene additional data from the object-based audio decoding unit 600, and the user controlled scene signal from the user control unit 900. Subsequently, the object-based audio signal detail control block 730 outputs the object-based audio signal and other control signals to the audio scene creating block 740. Other control information includes information on a level and a form of the object-based audio signal.

The audio scene creating block 740 creates an audio scene based on the object-based audio signal and a location control signal from: the object-based audio signal location control block 710, the object-based audio signal and a space control signal from the object-based audio signal space control block 720, the object-based audio signal and the detail control signal from the object-based audio signal detail control block 730, and the multi-channel audio signal from the object-based audio decoding unit 600, and outputs the audio signal to the restoring unit 800.

Figure 7:
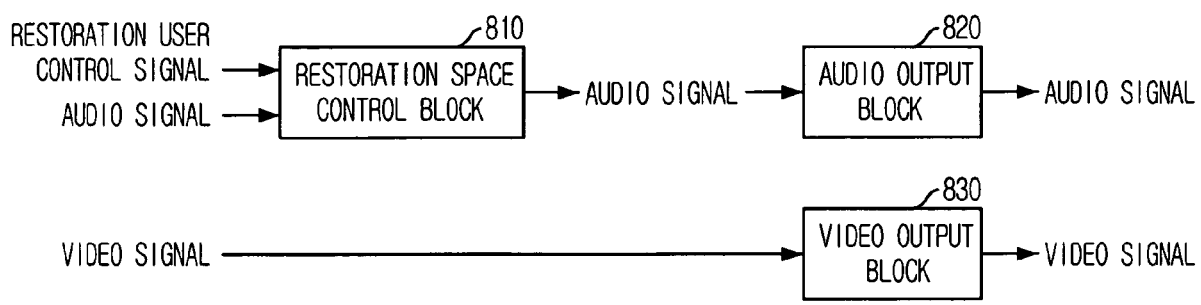
FIG. 7 is a block diagram illustrating a restoring unit of FIG. 1.

FIG. 7 is a block diagram illustrating the restoring unit of FIG. 1.

The restoring unit 800 includes a restoration space control block 810 and an audio output block 820. The restoring unit 800 can further include a video output block 830 for outputting the video signal from the object-based audio scene synthesizing unit 700.

The restoration space control block 810 equalizes a restoration space based on the audio signal from the object-based audio scene synthesizing unit 700 and the user controlled restoration signal from the user control unit 900, i.e., information on a restoration environment for restoring the audio signal. Equalizing the restoration space means removing the characteristics of the restoration space based on information on a size/form/characteristics and a speaker's location of the restoration environment from the user. Although the restoration environment is different from each other, an identical audio signal is outputted. That is, equalizing the restoration space is a process for equalizing characteristics information on a speaker arrangement or a size of a restoration space such that the user can listen to the same audio signal in environments which have different characteristics of the restoration space.

The audio output block 820 and the video output block 830 outputs the audio signal from the restoration space control block 810 and the video signal through a final output device.

Figure 8:
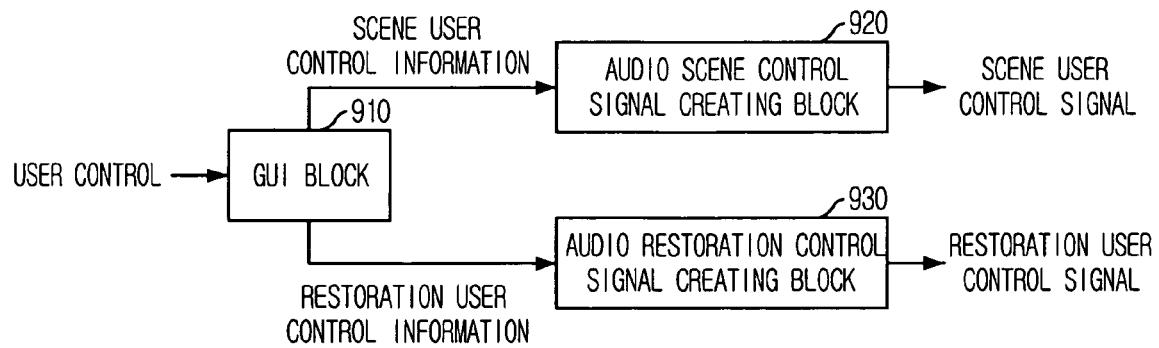
FIG. 8 is a block diagram illustrating a user control unit of FIG. 1.

FIG. 8 is a block diagram illustrating the user control unit of FIG. 1. The user control unit 900 includes a Graphic User Interface (GUI) block 910, an audio scene control signal creating block 920 and an audio restoration control signal creating block 930.

The GUI block 910 is an interface for controlling the audio scene or setting up the characteristics of the restoration space through a user interface by the user. The GUI block 910 provides the interface such that the user can control other attributes such as a location, a size or a form of the audio object as a GUI form, and control the characteristics of the audio scene and the restoration environment.

Also, when an editor multiplexes information on diverse audio scenes in an object-based audio content, the present invention provides the information on the diverse audio scenes to the user through the user interface such that the user can select a desired scene.

When the user changes the information on the audio scene through GUI, the audio scene control signal creating block 920 creates the user controlled scene signal based on the user controlled scene information from the GUI block 910 and outputs the user controlled scene signal to the object-based audio scene synthesizing unit 700. The user controlled scene signal includes location information of the object-based audio signal, space information, and other control information.

When the user changes setup for the restoration environment through GUI, the audio restoration control signal creating block 930 creates a user controlled restoration signal for restoration environment based on the restoration user control information the GUI block 910 and outputs the user controlled restoration signal to the restoring unit 800. The user controlled restoration signal includes information on a size, a form and a speaker arrangement of the restoration environment.

Figure 9:
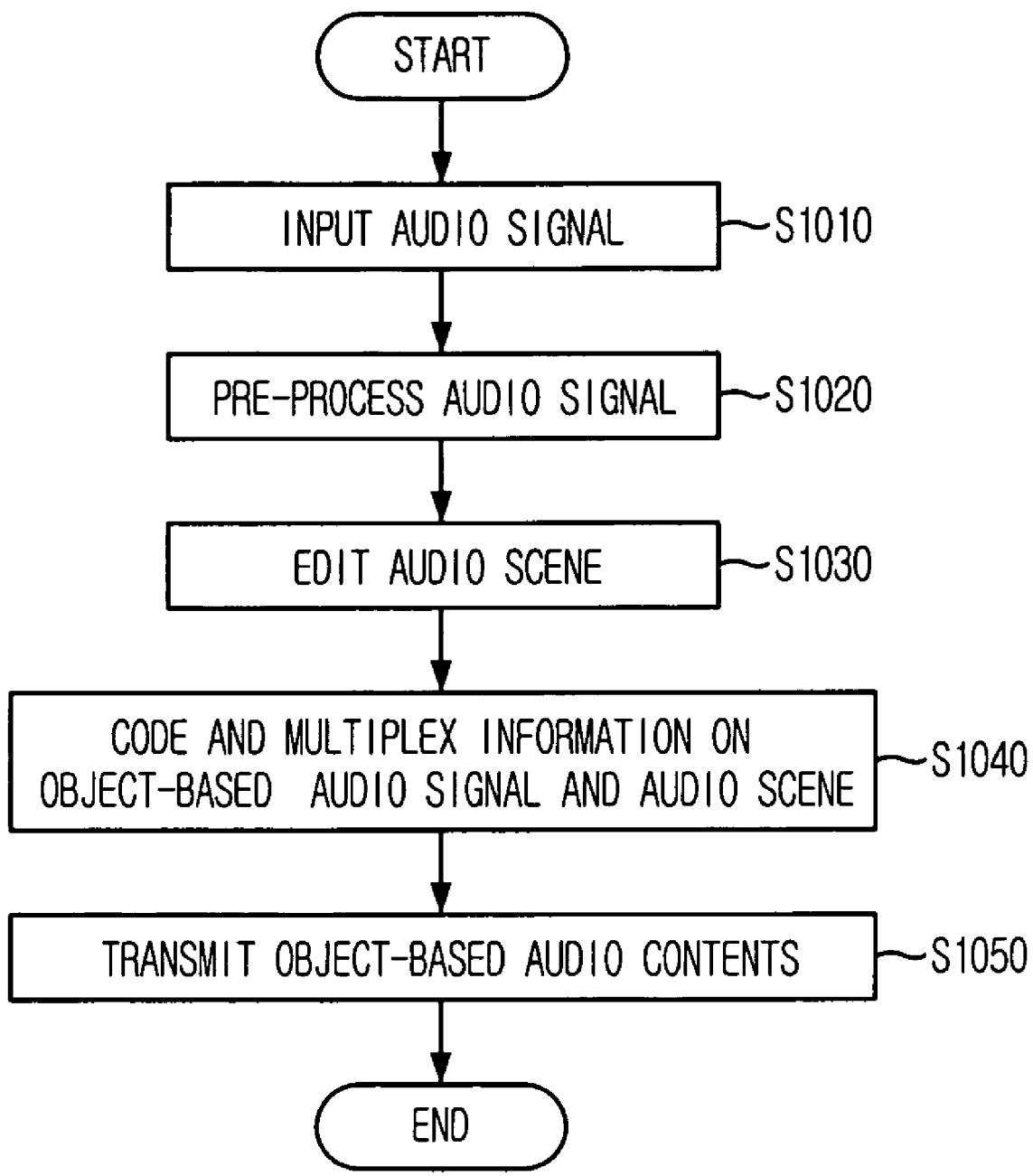
FIG. 9 is a flowchart describing an object-based audio transmitting method in accordance with an embodiment of the present invention.
Figure 10:
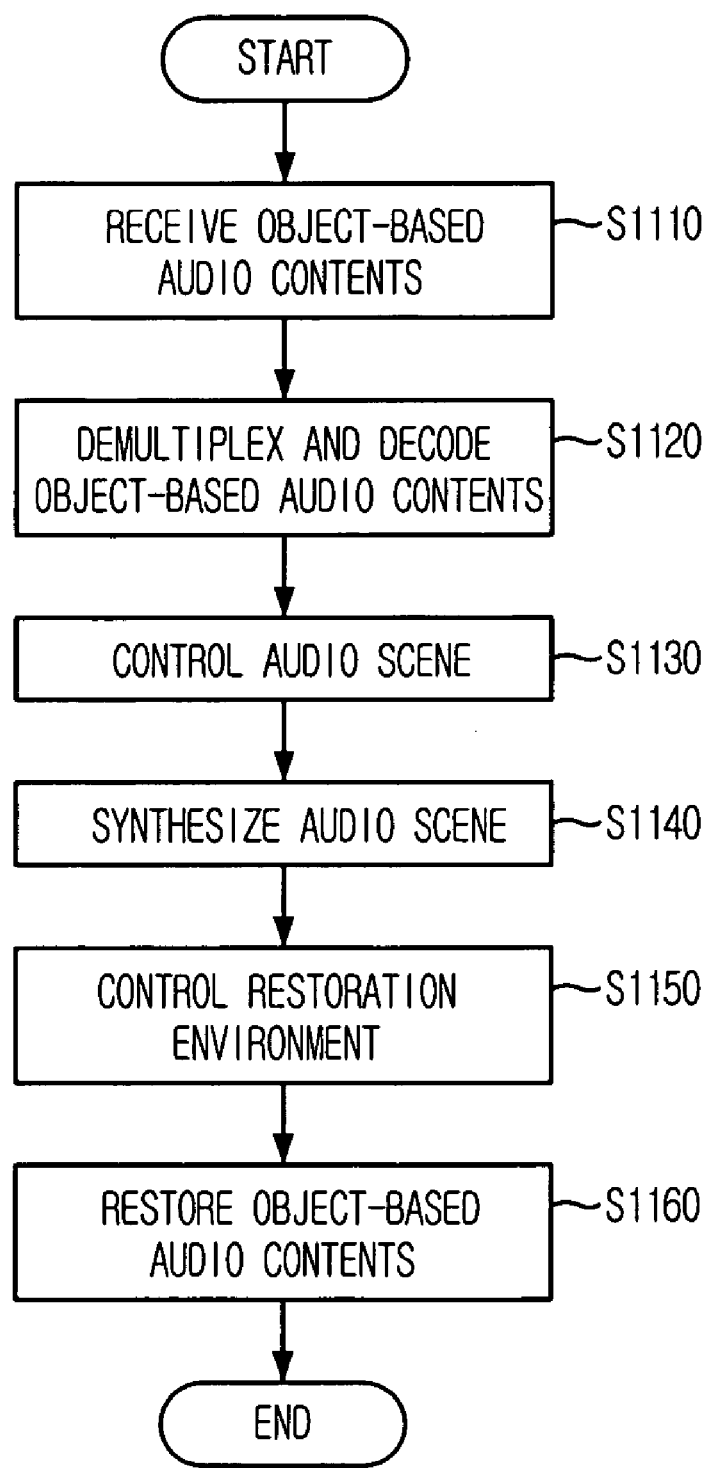
FIG. 10 is a flowchart describing an object-based audio receiving method in accordance with the embodiment of the present invention.

With reference to FIGS. 9 and 10, an operation procedure of the object-based audio transmitting/receiving system will be described hereinafter. Only a theme of the operation procedure will be described since a detailed embodiment of the object-based audio transmitting/receiving system is described in detail as above.

FIG. 9 is a flowchart describing an object-based audio transmitting method in accordance with an embodiment of the present invention.

An object-based audio signal is created through a pre-processing procedure by receiving an audio signal from diverse sources at steps S1010 and S1020. For example, the object-based audio signal and the multi-channel audio signal are created through the pre-processing procedure by receiving the object-based audio signal and the multi-channel audio signal from the diverse external sources. When diverse sound sources are mixed in the audio signal, the object-based audio signal can be created by separating a sound source.

The audio scene is organized by editing the created object-based audio signal at step S1030. For example, an editor can organize diverse audio scenes based on the created object-based audio signal, the multi-channel audio/video signal inputted from outside.

Object-based audio contents are created by coding and multiplexing information on the object-based audio signal and the audio scene at step S1040. For example, the object-based audio contents can be created by coding and multiplexing the information on the object-based audio signal and the audio scene with a video signal. Otherwise, the object-based audio contents can be created by coding and multiplexing the information on the object-based audio signal and the audio scene with the video signal/the multi-channel audio signal/multi-channel additional data.

The created object-based audio contents are transmitted through diverse media at step S1050. That is, the object-based audio contents produced by the editor are transformed to be transmitted through diverse transmission media and transmitted to a receiving system.

FIG. 10 is a flowchart describing an object-based audio receiving method in accordance with the embodiment of the present invention.

The object-based audio contents transmitted from the object-based audio transmitting system through media are transmitted at step S1110.

The transmitted object-based audio contents, e.g., additional data related to the object-based audio signal and audio scene, are decoded at step S1120. For example, the object-based audio contents inputted from outside are demultiplexed and decoded with the transmitted object-based audio contents, e.g., additional data related to the object-based audio signal and the audio scene. Accordingly, the object-based audio/video signal/multi-channel audio signal and scene additional data/multi-channel additional data can be created.

The audio scene is organized based on the object-based audio contents decoded according to the user controlled scene signal, e.g., based on additional data related to the object-based audio signal and audio scene, at step S1130 and S1140. For example, the user can select an audio scene among diverse audio scenes produced by the editor, or organize a new audio scene by controlling the object-based audio signal. It is also possible to organize the audio scene based on the additional data related to the object-based audio signal/multi-channel audio/video signal and the audio scene based on user controlled scene information from the user.

The object-based audio contents organizing the new scene, e.g., additional data on the object-based audio signal and the audio scene, are restored according to the user controlled restoration signal at steps S1150 and S1160. For example, the restoration environment is equalized based on the information on the restoration environment control from the user, and audio/video signals are restored and outputted based on the restoration environment.

As described above, the user can receive a new audio service with a three-dimensional (3D) effect and reality by editing attributes for each object of the audio signal based on the object-based audio transmitting/receiving system and controlling information based on the restoration environment.

The present invention has the editor create and provide diverse audio scenes to the user, and the user receive an interactive audio service with improved reality by selecting diverse audio scenes intended by the editor or organizing user's audio scene.

Also, when a concert hall of a singer is formed of the object-based audio contents, the present invention has the user control the voice of the singer, a location and a size of each instrument, and control information on a reverberation time/size/form of the concert hall, thereby organizing and listening to the user's audio scene.

Also, when sports relay is formed of the object-based audio contents, the present invention can raise or remove only the voice of an analyst or an announcer by controlling a voice of the analyst or the announcer, a shout of an audience and voices of players through each object. Also, the present invention can raise or remove the shout of audience. The present invention can raise or removes the voices of players such that the user can organize and listen to the audio scene which fits to the user's preference.

Also, in case of a string quartet, the present invention provides the editor with power of editing each of instrumental sound as an object-based audio signal and form the object-based audio contents by organizing a plurality of audio scenes forming each instrument as a center or changing characteristics of a stage. Also, the present invention provides the user with the selection of the audio scene which fits to the user's preference and receives the service.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent applications No. 2005-0103733 and No. 2005-0123816 filed with the Korean Intellectual Property Office on Nov. 1, 2005, and Dec. 15, 2005, respectively. The entire contents are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An object-based audio receiving system, comprising:
a receiving means for receiving object-based audio contents including an object-based audio signal and a plurality of audio scenes generated by editor;
an object-based audio decoding means for decoding the object-based audio contents;
a user control means for outputting a user controlled scene signal for organizing the audio scene;
an object-based audio scene synthesizing means for organizing the audio scene based on the object-based audio signal according to the user controlled scene signal; and
a reproducing means for reproducing the object-based audio contents based on the audio scene,
wherein the user control means enables the user to select a desired audio scene of a plurality of audio scenes generated by editor,
the object-based audio decoding means includes:
a demultiplexing block for demultiplexing the object-based audio contents and creating the object-based audio signal, and the audio scene;
a decoding block for decoding the object-based audio signal; and
an additional data decoding block for decoding the audio scene.

2. The system as recited in claim 1, wherein the user control means includes:
an interface block for providing user interface for controlling each object to organize the audio scene;
an audio scene control signal creating block for creating the user controlled scene signal related to the audio scene; and
an audio reproduction control signal creating block for creating a user controlled reproduction signal related to a reproduction environment.

3. The system as recited in claim 2, wherein the user controlled scene signal includes a location information of the object-based audio signal and a space information, and the user controlled reproduction signal includes information on a size, a form and a speaker arrangement of the reproduction environment.

4. The system as recited in claim 1, wherein the object-based audio decoding means includes:
a decoding block for decoding the object-based audio signal included in the object-based audio contents;
an additional data decoding block for decoding the audio scene included in the object-based audio contents.

5. The system as recited in claim 4, wherein the object-based audio scene synthesizing means includes:
an object-based audio signal location control block for controlling a location of the object-based audio signal;
an object-based audio signal space control block for controlling a space of the audio scene based on the object-based audio signal;
an object-based audio signal detail control block for changing a level or a form of the object-based audio signal.

6. The system as recited in claim 5, wherein the location of the object-based audio signal includes distance information from a virtual user location to the audio of each object, and information on horizontal and vertical angles for the audio signal of each object in the virtual user location; and space information includes characteristics such as a size, a form and a reverberation time of the space, and reflection, absorption and penetration of an inside sound.

7. The system as recited in claim 5, wherein the reproduction means includes:
a reproduction space control block for equalizing a reproduction space based on the object-based audio signal and a user controlled reproduction signal; and
an audio output block for outputting the object-based audio signal from the reproduction space control block.

8. The system as recited in claim 1, wherein the object-based audio scene synthesizing means includes:
an object-based audio signal location control block for controlling a location of the object-based audio/video signal;
an object-based audio signal space control block for controlling a space of the audio/video scene based on the object-based audio/video signal.

9. The system as recited in claim 8, wherein the reproduction means includes:
a reproduction space control block for equalizing a reproduction space based on the object-based audio/video signal and a user controlled reproduction signal;
an audio output block for outputting the audio signal; and
a video output block for outputting the video signal.

10. An object-based audio receiving method, comprising the steps of:
a) receiving object-based audio contents;
b) decoding the object-based audio contents including an object-based audio signal and a plurality of audio scene generated by editor;
c) organizing the audio scene based on the decoded object-based audio signal according to a user controlled scene signal; and
d) reproducing the object-based audio contents based on the audio scene,
wherein the step c) enables the user to select a desired audio scene of a plurality of audio scenes generated by editor.
select a desired audio scene of a plurality of audio scenes generated by editor,
wherein the decoding the object-based contents includes:
demultiplexinq the object-based audio contents;
creating a object-based audio signal, and a audio scene; and decoding the object-based audio signal and the audio scene.

11. The method as recited in claim 10, wherein the user controlled scene signal includes location information of the object-based audio signal and space information and
wherein step c) outputs a user controlled reproduction signal including information on a size, a form and speaker arrangement of a reproduction environment.

12. An object-based audio reproducing system, comprising:
a receiving means for receiving object-based audio contents including object-based audio signal and at least one of audio scene generated by an editor;
an object-based audio decoding means for decoding the object-based audio contents;
a user control means for enabling a user selects the audio scene of at least one of audio scene;
an object-based audio scene synthesizing means for synthesizing object-based audio signal based the selected scene data; and
a reproducing means for reproducing the synthesized object-based audio signal,
wherein the object-based audio decoding means includes:
a demultiplexinq block for demultiplexinq the object-based audio contents and creating the object-based audio signal, and the audio scene;
a decoding block for decoding the object-based audio signal; and
an additional data decoding block for decoding the audio scene.

13. An object-based audio reproducing method, comprising:
receiving object-based audio contents including object-based audio signal and at least one of audio scene generated by an editor;
decoding the object-based audio contents;
outputting the audio scene selected by user for at least one of audio scene;
synthesizing object-based audio signal based the selected audio scene; and
reproducing the synthesized object-based audio signal,
wherein the decoding the object-based contents includes:
demultiplexing the object-based audio contents;
creating the object-based audio signal, and the audio scene; and
decoding the object-based audio signal and the audio scene.

14. An object-based audio reproducing system, comprising:
a receiving means for receiving object-based audio contents including object-based audio signal and at least one of audio scene generated by an editor;
an object-based audio decoding means for decoding the object-based audio contents;
a user control means for providing interface to select the audio scene by user of at least one of audio scene;
an object-based audio scene synthesizing means for synthesizing object-based audio signal according to the selected audio scene; and
a reproducing means for reproducing the synthesized object-based audio signal,
wherein the object-based audio decoding means includes:
a demultiplexing block for demultiplexing the object-based audio contents and creating the object-based audio signal, and the audio scene;
a decoding block for decoding the object-based audio signal; and
an additional data decoding block for decoding the audio scene.

* * * * *